United States Patent

Sergel et al.

[11] Patent Number: 5,935,377
[45] Date of Patent: Aug. 10, 1999

[54] DEVICE FOR JOINING ENDS OF MATERIAL STRIPS

[75] Inventors: Horst Sergel, Hanover; Gerd Brandes, Hemmingen, both of Germany

[73] Assignee: Continental AG, Hannover, Germany

[21] Appl. No.: 08/813,616

[22] Filed: Mar. 7, 1997

Related U.S. Application Data

[63] Continuation-in-part of application No. 08/520,901, Aug. 30, 1995, abandoned.

[30] Foreign Application Priority Data

Aug. 30, 1994 [DE] Germany ............................ 44 30 703

[51] Int. Cl.[6] .................................................. B29D 30/30
[52] U.S. Cl. ................... 156/406.4; 156/163; 156/304.5; 156/405.1; 156/507
[58] Field of Search ........................ 156/405.1, 406.4, 156/406.6, 134, 229, 507, 304.2, 304.5, 160, 163; 72/295

[56] References Cited

U.S. PATENT DOCUMENTS

| | | | |
|---|---|---|---|
| 3,847,705 | 11/1974 | Habert et al. ......................... | 156/406.6 |
| 3,904,471 | 9/1975 | Kubinski .............................. | 156/406.4 |
| 4,857,123 | 8/1989 | Still et al. ............................ | 156/406.6 |
| 4,902,372 | 2/1990 | Mick, Jr. et al. ..................... | 156/406.4 |
| 5,292,398 | 3/1994 | Miyamoto et al. ................... | 156/406.6 |
| 5,348,600 | 9/1994 | Ishii ...................................... | 156/134 |

FOREIGN PATENT DOCUMENTS 699515  3/1996  European Pat. Off. ............ 156/406.6

*Primary Examiner*—Geoffrey L. Knable
*Attorney, Agent, or Firm*—Robert W. Becker & Associates

[57] ABSTRACT

A device for joining ends of material strips of rubber or plastic materials with rubber properties, wherein the ends to be joined have areas of reduced wall thickness and wherein the end cut first is stretched shortly before joining the two ends, includes a plurality of force-transmitting elements positioned adjacent to one another transverse to a longitudinal direction of the material strip at a forward end thereof and acting on one face of the material strip. At least the force-transmitting elements positioned at the areas of reduced wall thickness of the forward end are movable in the longitudinal direction of the material strip for stretching the forward end of the material strip at least within the areas of reduced wall thickness.

8 Claims, 6 Drawing Sheets

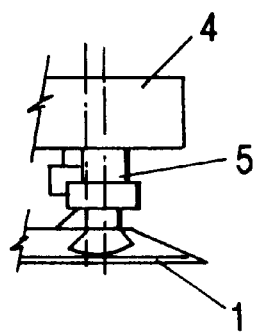 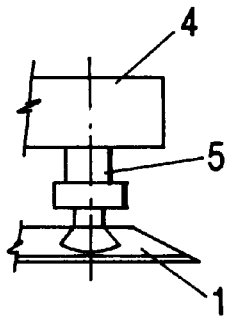 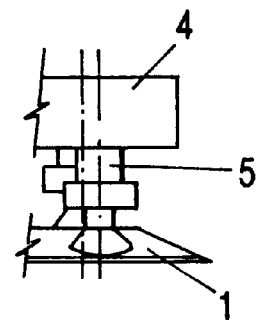
FIG-3a     FIG-4a     FIG-5a
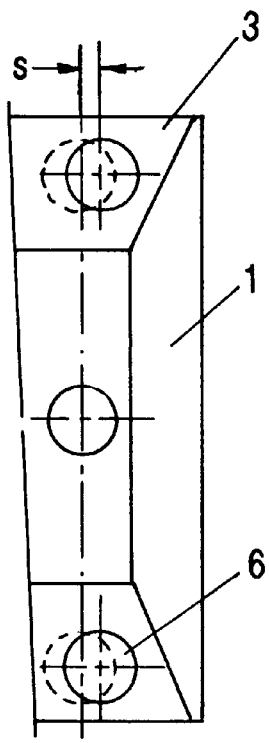 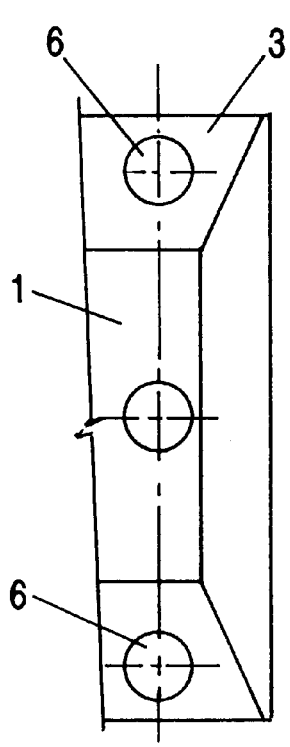 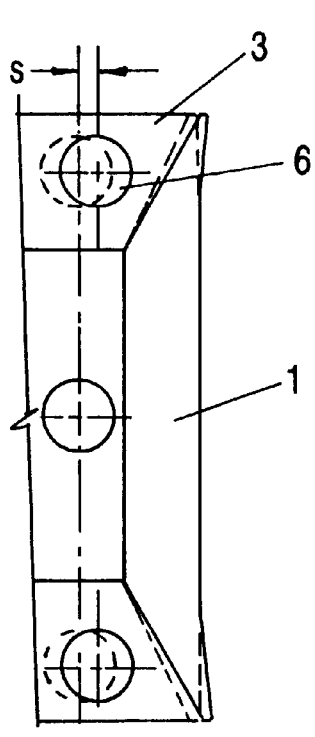
FIG-3     FIG-4     FIG-5

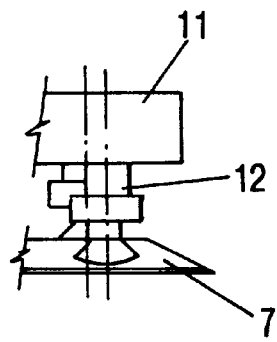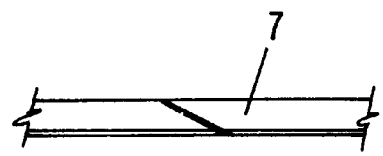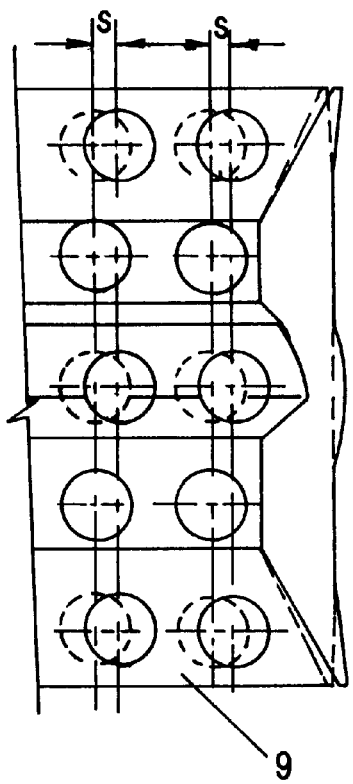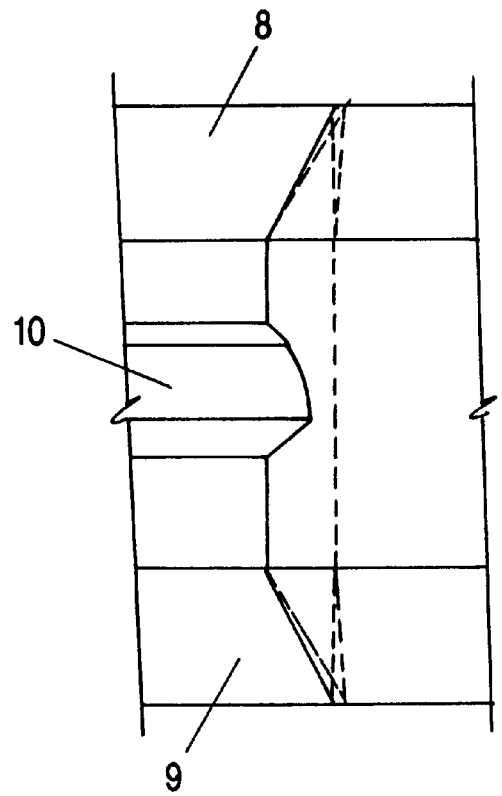

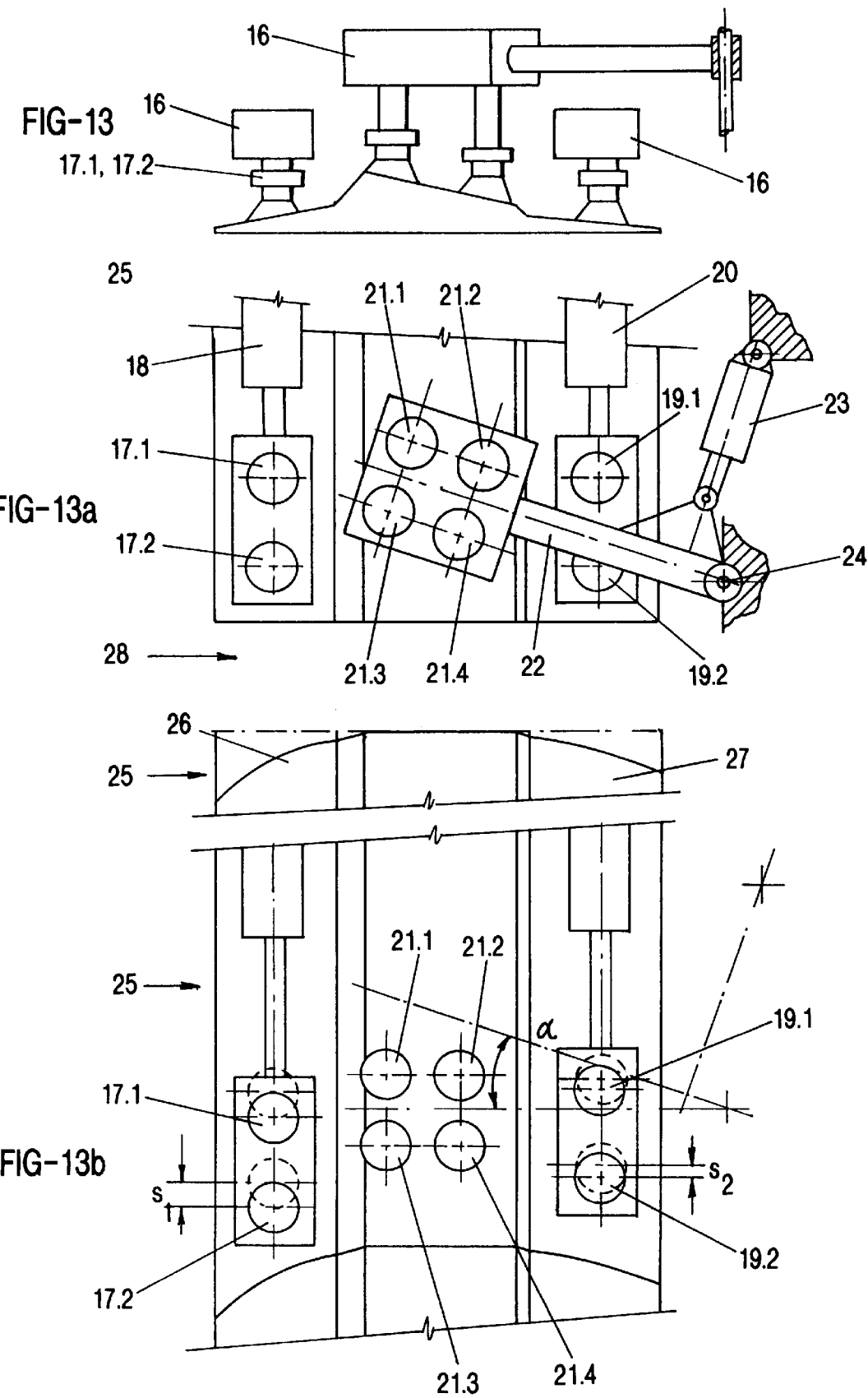

DEVICE FOR JOINING ENDS OF MATERIAL STRIPS

The present application is a Continuation-In-Part of application Ser. No. 08/520,901 filed Aug. 30, 1995, now abandoned.

BACKGROUND OF THE INVENTION

The present invention relates to a method and device for joining ends of material strips made of rubber or rubber-like plastic materials (plastic material having rubber, i.e. elastic, properties) with thin cross-sectional areas, especially thin material strip edges, wherein the end of the material strip which has been cut first is stretched immediately before joining the two ends.

In the manufacture of tires it is often required that material strips with thin material strip edges must be joined on a winding drum to a closed ring. The material strips are cut with a separating cut to the desired length and are placed onto the winding drum such that the ends of the material strips overlap in a defined manner. However, it is necessary that material accumulations within the overlap portion are to be prevented in order to avoid imbalance of the finished tire. The term overlap length refers to the amount of overlap of the two ends of the material strip which, due to the slanted cut (slanted with respect to the face of the material strip) of the two ends, will result upon joining without causing at the joint a material portion thicker than the material strip thickness. According to this definition, an abutting of the two ends for vertical cuts would result in an overlap length of zero while with increasing slant of the ends the overlap length will increase. Furthermore, it is easily understood that the overlap length in cross-sectional areas of greater material thickness is greater than in areas of thinner material thickness.

In practice, this results in the problem that the material strip, as a function of the rubber quality of the unvulcanized rubber mixture, will retract at the cut ends in areas of reduced thickness to a greater or lesser extent so that a uniform joining of the ends is made more difficult. This leads primarily to uncertainty with respect to the durability of the joint (splice) in the areas of reduced thickness.

This effect becomes furthermore more pronounced, when material strips consisting of different parts and mixtures are to be joined as is, for example, necessary for the premanufacture of sidewalls which, in general, are produced as an intermediate product either together with the bead strips or with portions neighboring the bead strips. In such material strips thinner portions are not only present within the edge portions but also within the central portion of the material strip.

The operator who winds the material strips can try to manually stretch the rearward end within the areas of reduced thickness during joining. However, this results in a non-uniform joining and, on the other hand, the main problem is not the rearward end of the material strip but the first cut and first applied end (forward end) of the strip of material.

U.S. Pat. No. 4,470,866 shows a device in which a material strip to be wound onto a drum and to be joined is engaged at its forward end facing the drum by grip elements 23 within the areas of reduced wall thickness and then conveyed to the drum. At the rearward end and within the central portion of the material strip, a braking roller reduces the transporting speed. This results in a forward stretching of the thin edges with the goal of compensating a possible retraction. Disadvantageously, a defined stretching is not possible with such a device because due to the different fixation points, respectively, braking points at the forward and rearward ends of the material strip, a stretched, respectively, tensioned state will result over the entire length of the material strip to be applied to the drum. After removal of the forward clamps, the material strip has the tendency to retract into a tension-free and thus undefined state.

U.S. Pat. No. 5,292,398 discloses a device in which the disadvantages of providing a tensioned state over the entire length of the material strip have been eliminated by providing a small distance between the clamps 29 that fix the central portion of the material strip and the clamps 109 that stretch the outer thin edges of the material strip. However, this device has the disadvantage that the entire stretching is performed at the rearward end of the material strip so that the clamping device itself must remain attached to the material strip for maintaining the tensioned state until the rearward end is applied to the building drum. Thus, the construction of the device requires a plurality of guide elements so that the entire rearward clamping and tensioning apparatus can be moved into a position at the building drum.

Before the next material strip can be placed onto the drum, the clamping and tensioning device must be returned into its initial position. This return action is disadvantageous with respect to manufacturing times.

U.S. Pat. No. 4,804,426 shows a handling device which is essentially comprised of a robot arm and a corresponding support head. The support head 9 is constructed such that central and lateral parts of an oncoming material strip are separately clamped, respectively, secured by vacuum and pulled onto the drum whereby either the forward or the rearward end of the material strip is stretched by an additional forward movement for rotation of the clamping devices that secure the thin lateral edges.

This device has the disadvantage that the clamping devices acting on the thin lateral edges of the material strip at least in part must come into contact with the building drum and must then be laterally removed from the work table. A stretching of the lateral parts is thus possible, however, a precise application of the material strip onto the drum is made more difficult.

In all of the previously known solutions it is a further disadvantage that the known devices comprise clamping devices which act onto the bottom face as well as the top face of the material strip so that the bottom face to be bonded adhesively in further manufacturing steps has already been subjected to mechanical loading instead of being simply guided load-free to the final adhesion step.

It is therefore an object of the present invention to provide a device of the aforementioned kind with which a joint (splice) of great durability can be produced within the areas of reduced material thickness, within edge portions as well as in the central portion of the material strips, with reproducible product quality.

SUMMARY OF THE INVENTION

The device for joining ends of material strips of rubber or plastic materials with rubber properties, wherein the ends to be joined have areas of reduced wall thickness and wherein the end cut first is stretched shortly before joining the two ends, according to the present invention is primarily characterized by:

A plurality of force-transmitting elements positioned adjacent to one another transverse to a longitudinal direction of the material strip at a forward end thereof and acting on one face of the material strip, wherein at least the force-transmitting elements positioned at the areas of reduced wall thickness of the forward end are movable in the longitudinal direction of the material strip for stretching the forward end of the material strip at least within the areas of reduced wall thickness.

Advantageously, the force-transmitting elements have different stroke lengths in the longitudinal direction.

The force-transmitting elements may comprise a first set acting on the areas of reduced wall thickness cut first in a transverse direction of the material strip and a second set acting on portions of the material strip cut subsequently in the transverse direction of the material strip, wherein the stroke length of the force-transmitting elements of the first set is different from the stroke length of the force-transmitting elements of the second set, and wherein the force-transmitting elements of the first set move together and the force-transmitting elements of the second set move together.

Advantageously, the force-transmitting elements comprise a third set acting on the areas of reduced wall thickness cut last in a transverse direction of the material strip, and the stroke length of the force-transmitting elements of the third set is different from at least one of the stroke lengths of the first and the second sets.

Expediently, the force-transmitting elements comprise a first set acting on the areas of reduced wall thickness cut first in a transverse direction of the material strip and a second set acting on portions of the material strip cut subsequently in a transverse direction of the material strip, wherein the force-transmitting elements of the first set move together in the longitudinal direction and wherein the force-transmitting elements of the second set pivot together about at least one common pivot axis extending perpendicular to the face of the material strip such that the second set stretches the portions of the material strip in the longitudinal and transverse directions.

Advantageously, the force-transmitting elements comprise a third set acting on the areas of reduced wall thickness cut last in a transverse direction of the material strip, and the stroke length of the force-transmitting elements of the third set is different from at least one of the stroke lengths of the first and the second sets.

Advantageously, the device further comprises a rolling device for rolling the joined ends.

The device may also further comprise a building drum downstream of the force-transmitting elements for receiving and joining thereon the ends of the material strip to a closed ring.

The force-transmitting elements may be suction cups or may comprise a stretching spike or a needle ring.

Preferably, groups of the force-transmitting elements adjacently arranged in the longitudinal direction are coupled for moving together.

The present invention also relates to a method for joining ends of material strips of rubber or plastic materials with rubber properties, wherein the ends to be joined have areas of reduced wall thickness and areas of unreduced wall thickness, the method according to the present invention comprising the steps of:

Cutting a forward end to be joined;

Cutting a rearward end to be joined;

Positioning at least one first force-transmitting element at the forward end in the areas of reduced wall thickness and positioning at least one second force-transmitting element at the forward end in the areas of unreduced wall thickness;

Stretching the areas of reduced wall thickness by a preset amount by advancing the at least one force-transmitting element relative to the at least one second force-transmitting element; and Joining by overlapping the forward and rearward ends immediately thereafter.

Preferably, the material strip has tapered lateral edges and, in the step of stretching, the tapered lateral edges of the forward end are stretched by up to 4 mm, further comprising the step of fixing the lateral edges of the forward end in the stretched state before the step of joining, such that joining takes place so as to provide an additional overlap within the areas of reduced wall thickness relative to an overlap length resulting from retraction of the tapered lateral edges without stretching.

In the step of cutting, the forward end of the material strip is cut in the transverse direction and, in the step of stretching, the lateral edge cut first is stretched more than the lateral edge cut second.

The method may further include the step of pressing the forward and rearward ends after joining with a rolling device.

The material strip may be a sidewall strip for a tire and the step of joining is carried out on a tire building drum for forming a closed ring of the sidewall strip.

The material strip may be a tread strip for a bicycle tire and the step of joining is carried out on a tire building drum for forming a closed ring of the tread strip.

According to the present invention, a plurality of force-transmitting elements is arranged on one face, preferably the top face, of the material strip in the transverse direction at different locations whereby at least the force-transmitting elements for gripping or holding the material strip within the areas of reduced thickness (thin cross-sectional areas) are embodied such that they are movable or displacable in the longitudinal direction of the material strip so that the forward end of the material strip can be stretched in a controlled manner at least in the areas of reduced wall thickness.

The gist of the invention is thus that the end of the material strip, which is cut first and which thus has the greatest tendency for retracting within the area of reduced wall thickness, is to be stretched in these areas by a device engaging only one face of the material strip so that during joining of the ends in these areas an additional overlap length (in comparison to the overlap length without stretching is generated and a secure placement onto the other end is achieved.

With the present invention undesirable excess material overlap as well as thicker wall portions resulting therefrom are advantageously avoided. Furthermore, no manual correction within the area of the joint (splice) is required. The invention is especially suitable for integration into automated manufacturing processes of tires. The invention is not only suitable for joining the ends of material strips to a closed ring but can also be used for joining two material strips in a plane.

The inventive device is especially advantageous for the application of a sidewall strip onto a tire building drum.

The sidewall strip material that is supplied from a roll or as an individually cut-to-length material strip has a cross-sectional shape that is adapted to the tire contour of the tire to be manufactured and also includes, in general, a bead strip, respectively, thickened areas within the vicinity of such a bead strip. Such a cross-section can, for example, be relatively thin within the edge portions, can then have at one side a large thickened portion to which is connected within the central portion a thinner portion as well as further portions with thickness variations until, at the opposite side of the sidewall strip, another thin edge portion is present.

Shortly after cutting the strip to length, a so-called banana shape results which more or less accidentally results from the different materials and material thickness and which is further enhanced if the sidewall strip itself is built of a plurality of different material strips connected in the longitudinal direction to one another.

The inventive device with its plurality of force-transmitting elements which are placed onto the forward end of the banana-shaped strip allows the force-transmitting elements within the retracted areas of thinner cross-section to be displaced or moved relative to the other force-transmitting elements. Thus, a stretching of the thinner portions to such an extent can be performed that the banana shape is eliminated and a stretching for the subsequent overlap step results which allows the building of a closed ring with problem-free overlap or splice areas.

According to a preferred embodiment, the device is used for working a material strip with tapered lateral edges and provides for a stretching within the lateral edge area of the material end, at which the separation cut has been applied, by about 4 mm so that upon joining in the two areas of the lateral edges an additional overlap length results. Since the separating cut carried out in the transverse direction of the material strip requires a certain amount of time, for example, 6 seconds, it is possible that the first-cut thin area retracts to a greater extent than the area cut last. According to an embodiment of the invention the first-cut area is thus stretched to a greater extent than the last cut area. It is expedient, after formation of the joint of the two material ends, to roll the overlap area with a rolling device whereby especially slight wall thickness fluctuations due to the additional overlap length in the area of the edges of the material strip can be smoothed.

In another advantageous embodiment of the device a first set of force-transmitting elements acting on the areas cut first in the transverse direction of the material strip can be moved together by a stroke length in the longitudinal direction of the material strip that is different than a stroke length of a second set of force-transmitting elements that can be moved together by a second stroke length in the area of the later cut areas of the material strip.

With such an embodiment it is possible, depending on the cross-sectional changes of the material strip to be worked, to displace entire material strip areas together in a uniform manner.

Especially for sidewall strips which in certain areas have especially great cross-sectional changes, it is possible that the retraction within the thinner areas is so great that even a forward stretching in the longitudinal direction does not result in the desired compensation because neighboring portions of much greater thickness block a displacement in the longitudinal direction. In general, even after stretching, a sudden contour jump may still be present. In such cases, according to a further advantageous embodiment of the device, a first set of force-transmitting elements acting on the first-cut thinner portions of the material strip can be moved together in the longitudinal direction of the material strip and a second set of force-transmitting elements can be pivoted about one or more common pivot axes extending substantially perpendicular to the face of the material strip to such an extent that the portions of the material strip acted on by the second set of force-transmitting elements is stretched in the longitudinal and transverse directions.

Especially in combination with a third set of force-transmitting elements which act on portions of the material strip cut last in the transverse direction and are displaceable in the longitudinal direction of the material strip about a stroke length that is different than the stroke length of the first and/or the second set of force-transmitting elements, it is possible to perform the forward displacement, respectively, stretching of the thinner areas while simultaneously subjecting the thicker portions to a multi-axis, but substantially planar tensioned state so that excessive thickness reductions within the thinner portions are avoided.

The pivotability of the second set of force-transmitting elements can be realized with a simple pivot lever or with a pantograph linkage with a plurality of parallel axes.

The present invention can also be applied to the tread strip of a bicycle tire. The device is characterized in that a generally known transporting device can be easily modified so that at least the elements for gripping the material strips in the areas of reduced wall thickness (thin cross-sectional areas) can be controllably displaceable force-transmitting elements for displacement in the longitudinal direction of the material strip. With this displaceability relative to the elements which grip the material strip within the thicker portions, a precisely defined stretching in the forward direction of the forward material end in the area of the thinner edge portions is ensured.

The force-transmitting elements can be, for example, in the form of vacuum suction cups, but alternatively can also be in the form of stretching spikes or needle rings. Of course, combinations of such elements are also possible. For example, the combination of needle rings and vacuum suction cups is especially advantageous because the vacuum suction cups thus provide only securing forces and the needle rings with their needles, due to the positive-locking action, can transmit the longitudinal forces in a secure manner for performing the defined stretching operation.

According to a preferred embodiment, the device is embodied as a tandem arrangement in which the elements for gripping and transporting the forward ends of the material strips are arranged in two transverse rows behind one another.

According to the inventive method, the end of the material strip which is first cut is stretched in the area of reduced wall thickness, shortly before joining the two ends, by a defined amount. The device for performing the inventive method is provided with at least one and preferably a plurality of force-transmitting elements for securing the forward end of a material strip at different locations in the transverse direction of the strip and is characterized in that at least the holding members (force-transmitting elements) for securing the material strip within the area of reduced wall thickness are controllably displacable in the longitudinal direction of the material strip.

According to a preferred embodiment the method is to be used with material strips that have tapered lateral edges whereby the material strip end which is cut first is stretched at the lateral edges by an amount of up to 4 mm so that during joining within the two areas of the lateral edges an additional overlap length is provided. Since carrying out the cut in the transverse direction of the material strip requires a certain amount of time, for example, 6 seconds, it is possible that the first cut area of reduced thickness retracts to a greater extent than the area of reduced thickness cut last. According to a further embodiment of the invention it is thus suggested to stretch the first cut area to a greater extent than the last cut area. It is advantageous, after forming the joint of the two ends of material strips, to roll the overlap area with a rolling device whereby especially slight fluctuations of the wall thickness due to the additional overlap length in the area of the lateral edges can be compensated or smoothed.

BRIEF DESCRIPTION OF THE DRAWINGS

The object and advantages of the present invention will appear more clearly from the following specification in conjunction with the accompanying drawings, in which:

FIG. 3 shows the material strip of FIG. 2 with applied suction cups in a top view, the lateral edges being stretched forwardly;

FIG. 3a shows the material strip of FIG. 2 and the actuated manipulating device in a side view;

FIG. 4 shows a material strip with a distortion-free cut and with applied suction cups in a top view;

FIG. 4a shows in a side view the material strip of FIG. 4 and the manipulating device in its operating position;

FIG. 5 shows in a top view the material strip of FIG. 4 with activated suction cups having pulled the lateral edges forwardly;

FIG. 5a shows in a side view the material strip of FIG. 5 and the manipulating device in operating position;

FIG. 7b shows in a front view the sidewall material strip with the manipulating device in operating position;

FIG. 11 shows in a plan view the material strip of FIG. 10 with actuated suction cups and with stretched edges;

FIG. 11a shows in a side view the material strip of FIG. 11 and the manipulating device in operating position;

FIG. 12 shows in a plan view a sidewall material strip in the area of the joint with additional overlap in the thin zones;

FIG. 12a shows the material strip of FIG. 12 in a side view;

FIG. 13 shows a sidewall material strip with extreme thickness variations and a pivotable manipulating device for a number of force-transmitting elements;

FIG. 13a shows the arrangement according to FIG. 13 in a plan view; and

FIG. 13b shows the device of FIGS. 13 and 13a after completion of the stroke in the longitudinal direction of the various force-transmitting elements.

DESCRIPTION OF PREFERRED EMBODIMENTS

The present invention will now be described in detail with the aid of several specific embodiments utilizing FIGS. 1 through 13b.

Figure 1A:
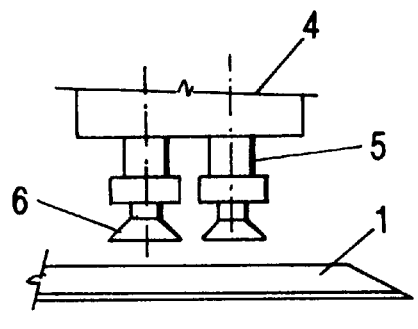
FIG. 1a shows in a side view the material strip with a manipulating device in its rest position positioned thereabove.
Figures 1, 1B:
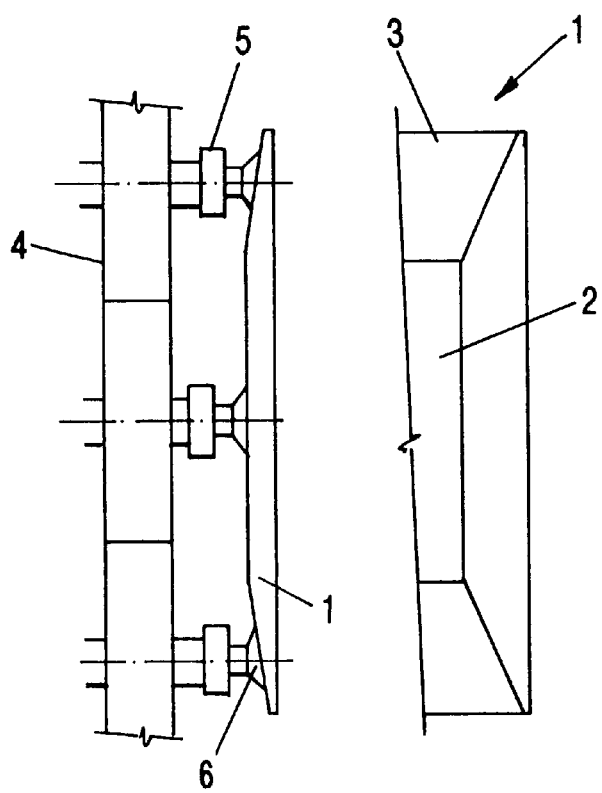
FIG. 1 shows schematically the forward end of a material strip with a distortion-free cut in a top view.
FIG. 1b shows in a front view the material strip with the manipulating device in the operating position.

FIG. 1 shows the forward (leading) portion of a material strip 1 made of rubber or a rubber-like plastic material in a top view. For simplifying the terminology used in the specification in the context of this application the terms rubber, respectively, rubber-like plastic material include especially also materials in the unvulcanized state as used during the manufacture of green tires. The rubber or rubber-like plastic material is thus in a plastic state in contrast to the elastic state after vulcanization. The material strip 1 has a substantially trapezoidal cross-section with a relatively thick center portion 2 and with tapered thin lateral edges 3. At the forward end the material strip 1 is cut by a distortion-free slanted cut. A slanted cut in the context of this application refers to a cutting plane which deviates from a vertical cut.

FIG. 1a shows the material strip 1 as well as a device for performing the method in the form of a manipulating device 4 which is a vacuum transporting device shown in its rest position. In FIG. 1b the manipulating device 4 is in its operating position in which it has gripped the forward end of the material strip 1, whereby at least one holding member 5 grips respectively the thin lateral edges and the central portion of unreduced thickness.

The manipulating device 4 comprises holding members 5 which are provided with suction cups 6 for securing the material strip 1. Some of the holding members 5 are in the form of force-transmitting elements which are controllably displaceable in the longitudinal direction of the material strip 1. In the shown embodiment the holding members 5 are positioned in a so-called tandem arrangement, i.e., they are mounted in two adjacently arranged transverse rows across the material strip 1 whereby each one of the rows comprises three holding members. The centrally positioned holding member 5 in each row is stationary, i.e., it is non-displaceable in the longitudinal direction of the material strip 1 while the laterally positioned holding members 5 are in the form of force-transmitting elements which are displaceable. The distance of the holding members 5 in the transverse direction of the material strip 1 is selected such that the centrally arranged holding member 5 secures the material strip 1 at the thick central portion 2 while the laterally positioned force-transmitting elements 5 secure the material strip 1 within the areas of reduced thickness (thin lateral edges). The suction cups 6 can have a diameter of approximately 15 mm while the distance between the two tandem rows is approximately 20 mm.

Figure 2A:
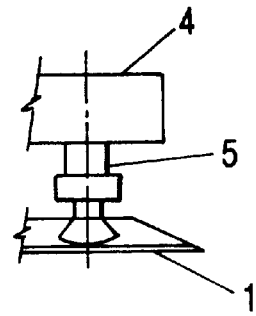
FIG. 2a shows in a side view the material strip of FIG. 2 with a manipulating device in operating position.
Figure 2:
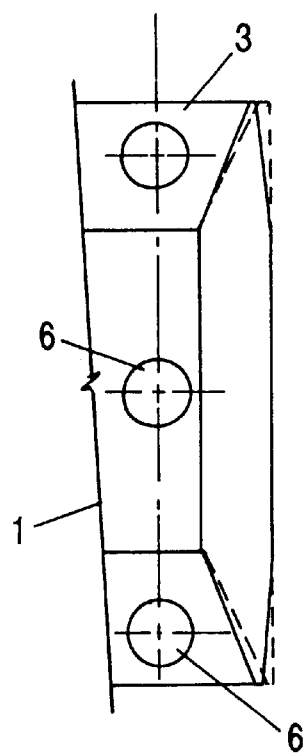
FIG. 2 shows the forward portion of the material strip with a retracted cut end in a top view.

FIG. 2 shows a material strip 1 with suction cups 6 applied thereto in which, however, the cut edge, relative to a distortion-free cut in the area of reduced wall thickness (thin lateral edges 3), is retracted. The amount of retraction depends, on the one hand, on the quality of the rubber mixture of the material strip and, on the other hand, on the time lapsed after application of the cut. In practice it is within a magnitude of two millimeters for rubber profile strips for tire production. FIG. 2a shows the material strip 1 of FIG. 2 in a side view with the forward half of the applied manipulating device 4. The transition from FIG. 2 to FIG. 3 illustrates the gist of the inventive method. While the centrally arranged holding members 5 in FIGS. 2 and 3 are stationary with respect to the material strip 1, the laterally positioned holding members 5 are force-transmitting elements with suction cups 6 which are displaced by a compensation stroke S in the forward direction so that the material strip 1 in the area of the retracted lateral edges is forwardly stretched. The compensation stroke S and thus the amount of stretching can, in general, be 2 to 4 mm. In FIG. 3a the aforedescribed facts according to FIG. 3 are shown in a side view. It is shown that the laterally positioned force-transmitting elements 5 are forwardly displaced relative to the centrally positioned holding members 5 in the longitudinal direction of the material strip 1.

In FIGS. 4 and 5 a further variant of the inventive method is disclosed. In FIG. 4 a material strip 1 is shown in which the forward side has a distortion-free cut. FIG. 4a shows this material strip 1 and the applied manipulating device 4 in a side view. The transition to FIG. 5 shows the lateral force-transmitting members 5 displaced by the compensation path S so that the material strip 1 in the area of the lateral edges 3 is stretched. FIG. 5a shows the corresponding position of the manipulating device 4 in a side view. The compensation path in general can be 2 to 4 mm.

In the following the inventive method will be explained with the aid of a material strip 1 which is applied to a conventional winding drum in order to be formed to a closed ring for a sidewall for a green tire. With respect to the forward cut end of the material strip 1, a condition according to FIG. 2 (cut end retracted) or a condition according to FIG. 4 (distortion-free cut) can be present. Both variants can occur during production.

Figure 6A:
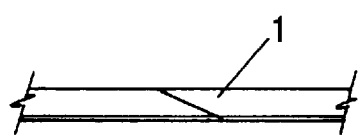
FIG. 6a shows the material strip of FIG. 6 in a side view.
Figure 6:
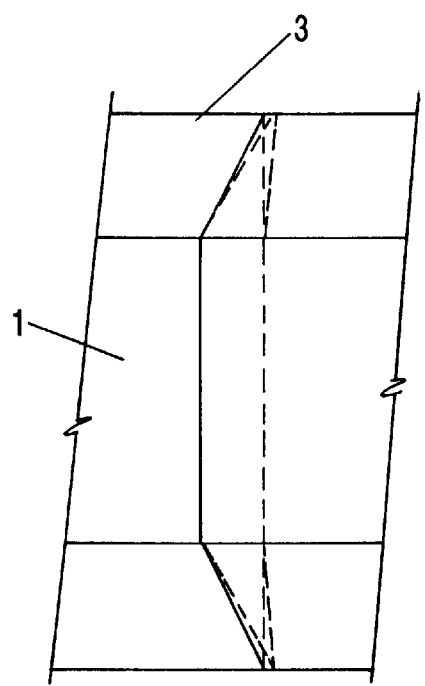
FIG. 6 shows in a top view a material strip in the area of the joint with additional overlap in the areas of reduced wall thickness.

The forward end of the material strip 1 is secured by the suction cups 6 of the lowered manipulating device 4 and is transported in the direction toward the non-represented winding drum. Shortly before placing the forward end of the material strip 1 onto the winding drum, the material strip 1 is stretched in the areas of reduced wall thickness in the aforedescribed manner (compare FIGS. 3 and 5). After application of the forward end of the material strip 1 onto the winding drum, the material strip 1 is fixed in its position in the stretched state. This, in general, can be performed by fixation from the top or from the bottom. For fixation from the bottom it is conventional to provide the interior of the winding drum with a suction device. Subsequently, the material strip 1 is applied to the winding drum until approximately the circumferential length has been reached. Only then the cut at the rearward end of the material strip 1 for the sidewall is performed so that directly thereafter, i.e., approximately two seconds after completion of the cut, joining to a closed ring will occur. This joining is represented in FIGS. 6 and 6a. Thus, a joint of increased durability results, especially within the sensitive lateral edge areas of reduced wall thickness due to the generated additional overlap length. Finally, the joint, especially within the area of reduced wall thickness, is pressed with a conventional rolling device so that possibly present thickness variations within the wall thickness can be compensated. In the disclosed method, the forward end of the material strip is cut approximately 6 seconds before forming the joint while the cut at the rearward end is carried out approximately only 2 seconds before joining so that only the forward end of the material strip has enough time to retract within the areas of reduced wall thickness.

It should be noted that the inventive method cannot only be used for producing closed rings on a winding drum, but also in such manufacturing processes in which two ends of a material strips 1 with areas of reduced wall thickness are to be joined in a plane.

Figure 7A:
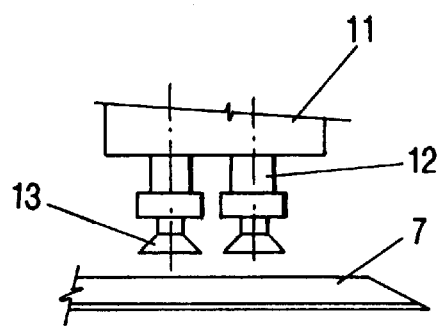
FIG. 7a shows in a side view a sidewall material strip with manipulating device positioned thereabove in the rest position.
Figure 7:
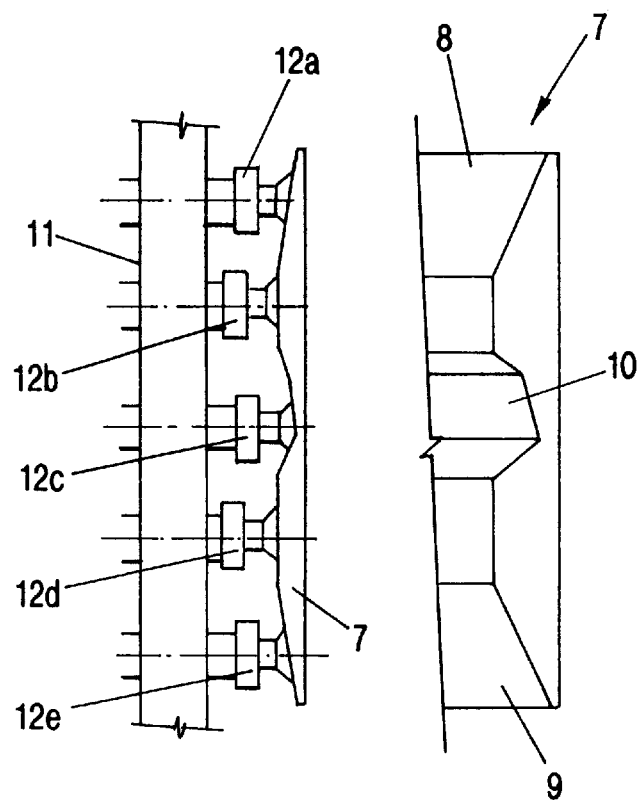
FIG. 7 shows the forward end of a material strip of a sidewall strip with distortion-free separating cut in a plan view.

FIG. 7 shows the forward portion (forward end) of a material strip 7 of a sidewall material strip of rubber or a rubber-like plastic material in a plan view, whereby the sidewall material strip has different material thickness variations across its cross-section. The sidewall material strip comprises lateral edges 8, 9 of a substantially trapezoidal, thin cross-section which have transitions into a thick central portion having a central area with a reduction in thickness at 10 whereby the material thickness changes across the cross-section. At its forward end the material strip 7 is provided with a distortion-free separating cut in the form of a slanted cut.

FIG. 7a shows the sidewall material strip 7 as well as a manipulating device 11 in the form of a vacuum transporting device which is in its rest position. In FIG. 7b the manipulating device 11 is in its working position in which the forward end of the sidewall strip has been gripped. The manipulating device 11 comprises force-transmitting elements 12a–e which act on one face of the material strip and, for gripping the sidewall material strip, are provided with suction cups 13 some of which are provided with needle rings. The force-transmitting elements which are provided with non-represented needle rings are controllably displaceable in the longitudinal direction of the sidewall material strip 7. In the shown embodiment the force-transmitting elements are arranged in a tandem arrangement, i.e., they are positioned in two adjacent transverse rows 14 and 15 whereby each row comprises five force-transmitting elements. The externally and the centrally arranged force-transmitting 12a, c, e elements are displaceable in the longitudinal direction of the material strip, while the intermediately positioned force-transmitting elements 12b, 3 are stationary. The distance of the force-transmitting elements 12a–e in the transverse direction of the sidewall material strip is selected such that the externally arranged (12a, e) and the centrally arranged force-transmitting elements (12c) grip the sidewall material strip at the thin zones 8, 9 and 10 while the intermediately positioned force-transmitting elements (12b, d) grip the material strip at the thicker central portions.

Figure 8A:
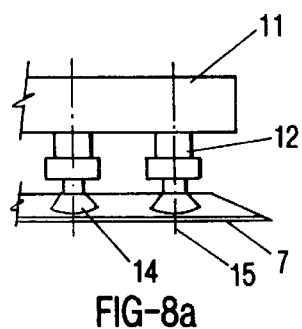
FIG. 8a shows in a side view the material strip of FIG. 8 with the manipulating device in operating position.
Figure 8:
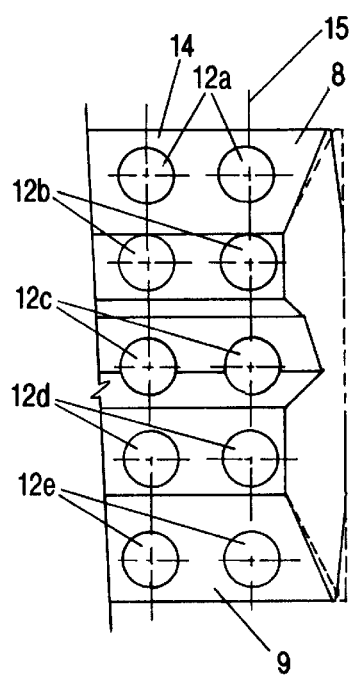
FIG. 8 shows the forward end of the sidewall material strip with retracted cut edges in a plan view.

FIG. 8 shows the sidewall strip with applied suction cups 13 whereby the transverse edge of the cut end, relative to the distortion-free cut, has retracted in the area of the thinner portions 8, 9 and 10. The amount of retraction depends on the quality of the rubber mixture, the material strip, and on the time elapsed after cutting the material strip and is also affected by the presence of already joined materials within the strip. The amount of retraction for already joined materials in practice is approximately 2 to 3 mm. FIG. 8a shows the sidewall strip of FIG. 8 in a side view with the forward half of the positioned manipulating device 11. The transition from FIG. 8 to FIG. 9 illustrates the inventive concept of the inventive device.

While the laterally and centrally arranged elements 12a, c, e with suction cups in the areas 8, 9 and 10 are forwardly displaced by the compensation stroke s, the intermediately arranged suction cups are controlled to remain stationary at their original position so that the sidewall material strip in the retracted areas is stretched. The compensation stroke s and thus the amount of stretching can be, in general, 3 to 5 mm.

Figure 9A:
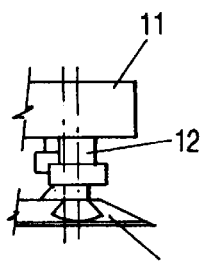
FIG. 9a shows in a side view the material strip of FIG. 9 and the actuated manipulating device.
Figure 9:
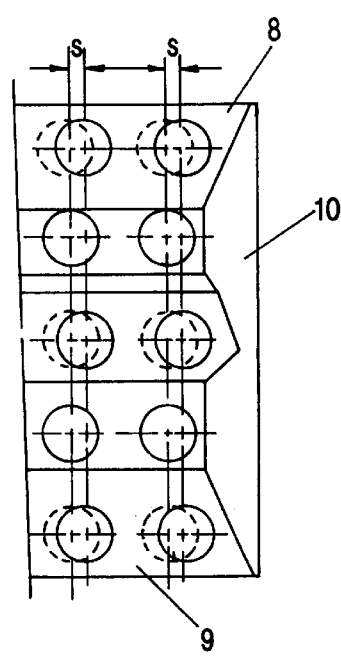
FIG. 9 shows in a plan view the material strip of FIG. 8 with applied suction cups but with stretched edges.

In FIG. 9a the aforementioned conditions according to FIG. 9 are shown in a side view. It is shown that the laterally and centrally arranged force-transmitting elements 12a, c, e are displaced forwardly relative to the intermediately positioned force-transmitting elements 12b, d in the longitudinal direction of the sidewall material strip.

Figure 10A:
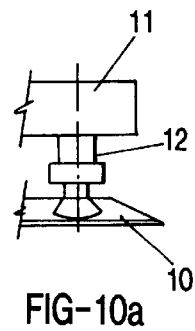
FIG. 10a shows in a side view the material strip of FIG. 10 and the manipulating device in operating position.
Figure 10:
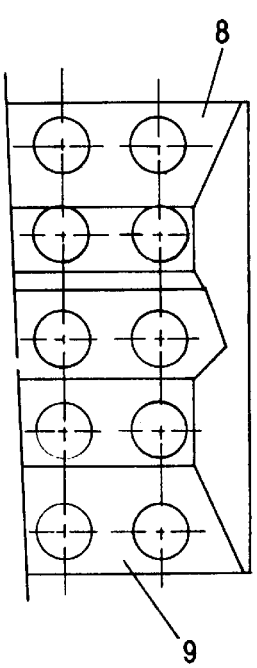
FIG. 10 shows a sidewall material strip with a distortion-free separating cut and with applied suction cups in a plan view.

FIGS. 10 and 11 show a further functional variant of the inventive device. A sidewall material strip 7, as disclosed in FIG. 10, is provided. At its forward end it is provided with a distortion-free separating cut. FIG. 10a shows this sidewall material strip and the applied manipulating device 11 in a side view. The transition to FIG. 11 shows the displacement of the laterally and centrally arranged force-transmitting elements 12a, c, e by a compensation stroke s so that the sidewall material strip in the area of the thin lateral edges 8 and 9 and the central thin portion 10 have been stretched. FIG. 11a shows the corresponding position of the manipulating device 11 in a side view. The compensation stroke s can be in general 3 to 5 mm. In this manner, for a sidewall band rubber or a sidewall material strip 7 a closed ring for a green tire is built.

FIG. 13 and FIG. 13a show a manipulating device 16 comprised of three parts in which a first set of two force-transmitting elements 17.1 and 17.2 can be displaced together in the longitudinal direction of the material strip by control cylinder 18.

A second set of force-transmitting elements 19.1 and 19.2 can also be actuated to be moved in the longitudinal direction by a control cylinder 20.

A further set of force-transmitting elements 21.1, 21.2, 21.3 and 21.4 are pivotable about a common pivot point 24 by lever arm 22 with the aid of the actuating cylinder 23 and can thus stretch the extremely thick central part of the strip 25 in the longitudinal direction as well as with a circular movement in the transverse direction so that it is subjected to a planar multi-axis tensioned state.

FIG. 13a shows the beginning of the operation in which the force-transmitting elements have just been placed onto the material strip, while FIG. 13b shows the condition after completion of the operation. The force-transmitting elements 17.1 and 17.2 have been displaced by a first stroke s1 in the longitudinal direction, while the force-transmitting elements 19.1 and 19.2 have been displaced by a smaller stroke s2 in the longitudinal direction.

The centrally arranged set of force-transmitting elements 21.1 to 21.4 have been pivoted about an angle α and have thus been moved by a stroke length in the longitudinal direction and in the transverse direction of the material strip.

FIG. 13a also shows the retraction of the thinner areas 26 and 27 which will occur approximately after 6 seconds after carrying out the separation cut in the direction 28.

In comparison to the retraction of the area 27 the area 26 has retracted to a much greater extent. This can be compensated by the simultaneous stretching of the thicker portions in the longitudinal and in the transverse direction.

After placing the forward end of the sidewall material strip onto the winding drum, it is fixed in the stretched state. This can be carried out from above or from below. In a fixation from below it is conventional to provide suction devices within the winding drum. Subsequently, the sidewall material strip is placed about the circumference of the winding drum until the required circumferential length has been reached. Only then the separating cut at the rearward end of the sidewall rubber is performed so that directly thereafter, i.e., within approximately 2 seconds after completion of the cut, the joining of the two ends to a closed ring is carried out. Thus, a joint of increased durability results, especially within the sensitive thin lateral edge areas due to the inventively produced additional overlap length. Subsequently, the joint especially within the areas of the thin edges is rolled with a conventional rolling device so that possibly present thickness fluctuations within the wall thickness can be compensated. In the described method the forward end of the material strip is cut approximately 6 seconds before producing the joint, while the separating cut at the rearward end is performed only two seconds before joining so that only the forward end of the material strip 1 has sufficient time to retract within the thin portions.

It should be noted that the inventive method can be used not only for the production of closed rings on a winding drum but also for such finishing processes in which two ends of a material strip 1 with thin edge portions are to be joined in a plane, e.g., for joining sequentially arranged material strips.

The present invention is, of course, in no way restricted to the specific disclosure of the specification and drawings, but also encompasses any modifications within the scope of the appended claims.

What we claim is:

1. In a device for joining ends of material strips of rubber or plastic materials with rubber properties, wherein the ends to be joined have areas of reduced wall thickness and wherein the end cut first is stretched shortly before joining the two ends; the improvement comprising:

a plurality of force-transmitting elements positioned adjacent to one another transverse to a longitudinal direction of the material strip at a forward end thereof and acting on one face of the material strip, wherein at least said force-transmitting elements positioned at the areas of reduced wall thickness of the forward end are moveable in the longitudinal direction of the material strip for stretching the forward end of the material strip at least within the areas of reduced wall thickness;

wherein said force-transmitting elements comprise a first set acting on the areas of reduced wall thickness cut first in a transverse direction of the material strip and a second set acting on portions of the material strip cut subsequently in a transverse direction of the material strip, wherein said force-transmitting elements of said first set move together in the longitudinal direction and wherein said force-transmitting elements of said second set pivot together about at least one common pivot axis extending perpendicular to the face of the material strip such that said second set stretches the portions of the material strip in the longitudinal and transverse directions.

2. A device according to claim 1, wherein said force-transmitting elements comprise a third set acting on the areas of reduced wall thickness cut last in a transverse direction of the material strip and wherein said stroke length of said force-transmitting elements of said third set is different from at least one of said stroke lengths of said first and said second sets.

3. A device according to claim 1, further comprising a rolling device for rolling the joined ends.

4. A device according to claim 1, further comprising a building drum downstream of said force-transmitting elements for receiving and joining thereon the ends of the material strip to a closed ring.

5. A device according to claim 1, wherein said force-transmitting elements are suction cups.

6. A device according to claim 1, wherein said force-transmitting elements comprise a stretching spike or a needle ring.

7. A device according to claim 1, wherein groups of said force-transmitting elements adjacently arranged in the longitudinal direction are coupled for moving together.

8. A device according to claim 1, wherein said force-transmitting elements of said first set and said force-transmitting elements of said second set have different stroke lengths in the longitudinal direction.

* * * * *